United States Patent [19]

Mendenhall

[11] 4,245,466

[45] Jan. 20, 1981

[54] DELTA ELECTROMAGNETIC CONTROL VALVE

[75] Inventor: Charles A. Mendenhall, Rochester, N.Y.

[73] Assignee: General Motors Corporation, Detroit, Mich.

[21] Appl. No.: 60,186

[22] Filed: Jul. 24, 1979

[51] Int. Cl.[3] .......................... F01N 3/15; F01N 3/10; F16K 11/02

[52] U.S. Cl. ........................................ 60/289; 60/301; 60/306; 137/625.42

[58] Field of Search ...................... 137/625.42; 60/289, 60/306, 301

[56] References Cited

U.S. PATENT DOCUMENTS 3,733,829 5/1973 Henault .................................. 60/301

3,921,396 11/1975 Nohira .................................. 60/306

FOREIGN PATENT DOCUMENTS 52-19811 2/1977 Japan ........................................ 60/306

*Primary Examiner*—Douglas Hart

*Attorney, Agent, or Firm*—Arthur N. Krein

[57] ABSTRACT

An electromagnetic valve has a housing with interior side walls defining a deltoid valve chamber with an inlet port opening thereto. Each of the three side walls defining the sides of the valve chamber has a discharge port extending therefrom. Each side wall also has a solenoid coil means associated therewith whereby flow to the respective ports can be controlled by a triangular shaped valve member. The valve member includes a hollow triangular shaped valve carrier having three armature valve elements movably positioned thereon. When any two solenoid coil means are energized, the corresponding valve elements are magnetically attracted to the respective solenoid coil means whereby to block flow out through the two associated ports, the valve carrier moving with these two valve elements effects movement of the remaining valve element to a position whereby to uncover the discharge port associated with the remaining de-energized solenoid coil means.

6 Claims, 5 Drawing Figures

DELTA ELECTROMAGNETIC CONTROL VALVE

This invention relates to an electromagnetic valve and, in particular, to a delta electromagnetic control valve that is particularly useful in an exhaust emission control system for the engine of an automotive vehicle. The delta electromagnetic control valve would be used in such a system for selectively switching the flow of secondary air from an air pump to either the exhaust manifold closely adjacent to the exhaust ports of the engine, to a catalytic converter located downstream in the exhaust sytem from the exhaust manifold or to divert the secondary air flow to the atmosphere.

It has been found that in an exhaust emission control system for internal combustion engines wherein the emission control system includes an air injection device for introducing secondary air into the exhaust system closely adjacent to the exhaust ports of an engine and a to a catalytic converter, for efficient and trouble free operation, it is necessary that the delivery of secondary air to either the exhaust ports or to the converter be selectively controlled. That is, secondary air should be supplied in suitable quantities, as required, to either the exhaust manifold for injection into the exhaust gases close to the exhaust ports or to the catalytic converter and, that air be diverted from both the exhaust manifold and from the converter during certain modes of engine operation.

Various exhaust emission control systems having one or more valves incorporated therein to serve the above described operation are currently in use or have been proposed for this type of application for use with automotive engines. The valves used in such systems have been either pressure or vacuum actuated and in certain applications, the flow of the control pressure or vacuum have in turn been controlled by one or more solenoid valves energized by suitable switches or via a suitable electronic control device as a function of engine operation.

However, because of the increased emission control requirements being made applicable to automotive vehicles, these prior art emission control systems and, in particular, the valve structures used therewith have become rather complicated, relatively large in size especially in view of the relatively limited under hood space available in passenger vehicles, and are relatively expensive to manufacture.

It is therefore a primary object of this invention to provide an improved electromagnetic valve having an inlet and three outlets, with flow through each outlet being controlled by a separate solenoid actuated valve.

Another object of this invention is to provide an improved electromagnetic valve which is of delta-shaped configuration with three separate solenoid actuated valves arranged therein to cooperate with respect to each other in a manner whereby to selectively control flow out through each of three separate valve outlet ports.

A further object of this invention is to provide an improved electromagnetic valve whereby separate solenoid actuated valves in a common valve housing are operative to control flow through separate associated ports in the valve housing, the solenoid actuated valves being operatively associated with a common valve carrier whereby flow through adjacent ports can be simultaneously blocked by energization of the respective solenoids for those outlets.

A still further object of this invention is to provide a delta electromagnetic valve that is particularly adapted for use as an air control and diverter valve assembly in the exhaust emission control sytem of a vehicle engine whereby secondary air supplied to the valve can be selectively delivered by the valve to the exhaust manifold of the engine, a catalytic converter, or to the atmosphere, as desired, as a function of engine operation.

Still another object of the present invention is to provide an electromagnetic valve of the above type which includes feature of construction, operation and arrangement, rendering it easy and inexpensive to manufacture, which is reliable in operation, and in other respects suitable for use on production motor vehicle exhaust emission control systems.

These and other objects of the invention are obtained in an electromagnetic valve which includes a housing defining a delta-shaped or deltoid valve chamber therein and having a common inlet to the valve chamber and three equally spaced apart outlets from the valve chamber. A triangle-shaped valve carrier operatively supports three separate valves, one for each outlet port. Each valve has a solenoid coil associated therewith, which when energized, will magnetically attract the associated valve to a position blocking flow through the respective outlet port. During operation when two solenoids are energized, the associated valves and the carrier are moved to a position blocking flow through that pair of associated outlet ports while carrying the other valve to a position relative to the remaining outlet port to permit flow through that outlet port. Each of the solenoid coils is independently connectable to a source of electrical power whereby selective energization of the solenoid coils can be affected.

For a better understanding of the invention, as well as other objects and further features thereof, reference is had to the following detailed description of the invention to be read in connection with the accompanying drawings.

Figure 1:
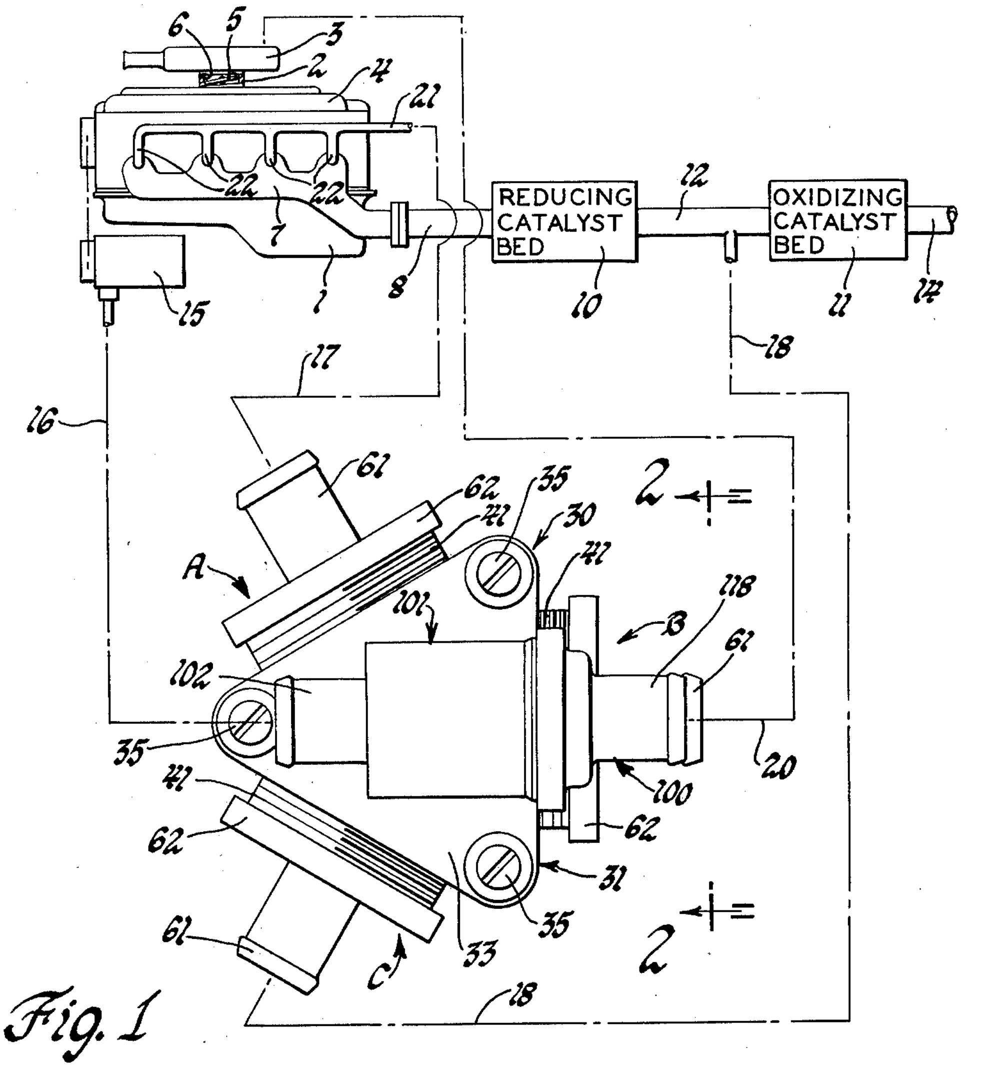
FIG. 1 is a schematic illustration of an internal combustion engine for an automotive vehicle, the engine having an exhaust emission control system with a dual bed catalylic converter associated therewith and having an electromagnetic control valve, in accordance with the invention, incorporated therein for controlling secondary air flow in the system, the electromagnetic valve being shown in plan view.

For the purpose of illustration and for describing the subject utility of the delta electromagnetic control valve as used in a particular application, this subject valve is shown in FIG. 1 as being used as an air control valve in the exhaust emission control system for a vehicle engine.

Thus referring to FIG. 1, an internal combustion engine 1 is provided, for example, with a carburetor 2 and an air cleaner 3 mounted thereon to supply an air-fuel mixture to the intake manifold 4 of the engine, As is conventional, primary air flow through to the carburetor to the engine is controlled by a throttle valve 5 pivotable within the induction passage 6 of the carburetor. The engine 1 has at least one exhaust manifold 7 positioned to receive the exhaust gases discharged through the exhaust ports, not shown, from the cylinders, not shown, of the engine and defines a flow path for the combustible exhaust gases discharged from the engine.

The exhaust manifold 7 discharges the exhaust gases theough an exhaust pipe 8 to dual bed catalytic converter including a reducing converter 10 having a reducing catalyst bed therein, and an oxidizing converter 11 having an oxidizing catalyst bed therein. These two converters are shown in the embodiment illustrated as enclosed by separate canisters and interconnected by a connector exhaust duct 12. The outlet end of the oxidizing converter 11 is connected to a conventional exhaust tailpipe 14.

An air pump 15, which may be engine driven in a conventional manner as shown, is used to deliver secondary air through a conduit 16 to an electromagnetic control valve, generally designated 30, constructed in accordance with the invention. The electromagnetic control valve 30 operates, in a manner to be described, as an air control valve for delivering secondary air via a conduit 17 to a region ahead of the reducing converter 10; via a conduit 18 to a region intermediate the reducing converter 10 and the oxidizing converter 11, as by having the conduit 17 operatively connected to the exhaust duct 12; and, in addition, to by-pass secondary air to the atmosphere, as via a conduit 20 connected to the air cleaner 3.

Although the secondary air delivered through conduit 17 can be introduced into the exhaust stream at any location ahead of the reducing converter 10, it is preferably introduced closely adjacent to the exhaust ports, not shown, of the engine 1. For this purpose, each exhaust manifold 7 has an air injection unit in the form of an air manifold 21 operatively associated therewith. As shown, the air manifold 21 is provided with a series of injection tubes 22 extending into the associated exhaust manifold 7, with the free end of these tubes terminating at a position downstream of and closely adjacent to the exhaust valves, not shown of the engine 1. With this arrangement, secondary air is delivered through these injection tubes 22 into the stream of exhaust gases or combustibles flow paths closely adjacent to the exhaust valves, not shown, of the engine.

The electromagnetic control valve 30 of the invention, in the embodiment shown, includes a multi-piece valve housing 31 having as major components thereof a lower valve body 32 and an upper cover 33, with reference to the figures, that are suitably secured together with a suitable apertured gasket 34 sandwiched therebetween.

In the construction shown, the upper cover 33 is secured to the lower valve body 32 by means of screws 35. Each screw 35 extends through an associated aperture 36 in the cover 33 for threaded engagement in an associated internally threaded aperture 37 (FIG. 4) in the valve body 32.

Figure 2:
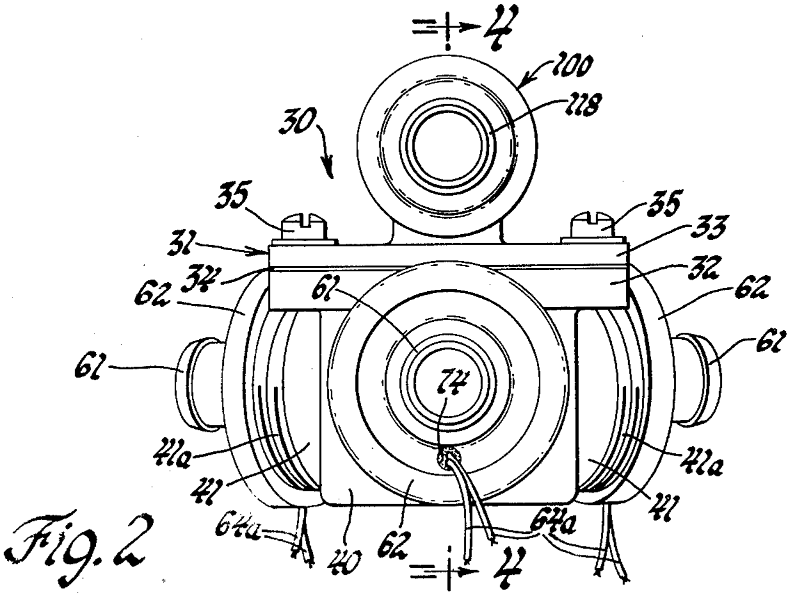
FIG. 2 is an elevational view of the electromagnetic valve of FIG. 1 taken along a line corresponding to line 2—2 of FIG. 1.
Figure 3:
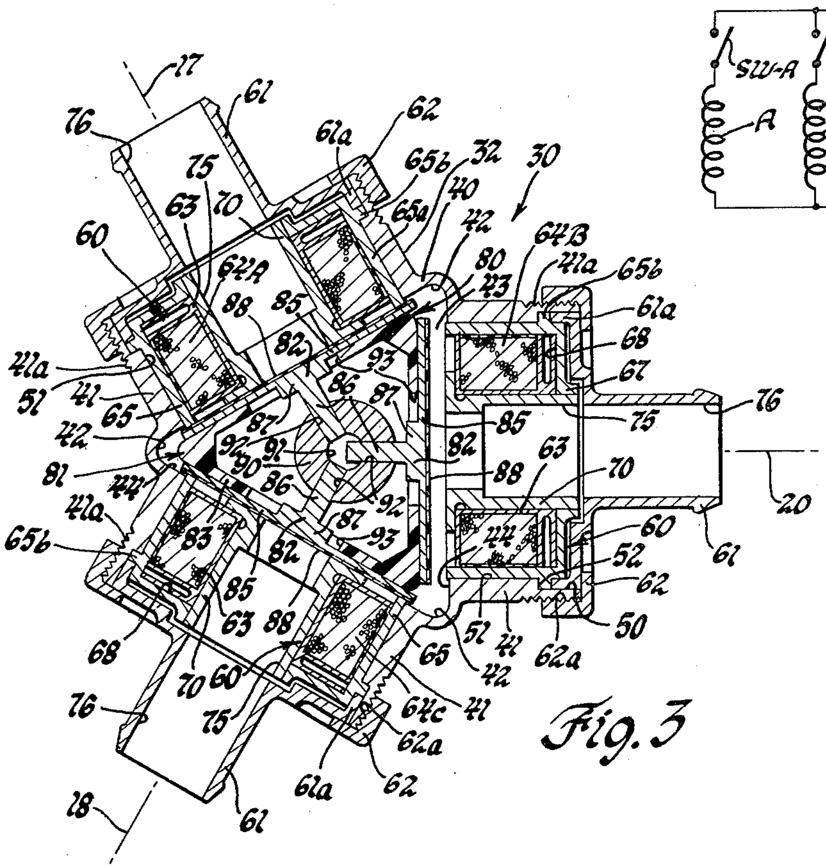
FIG. 3 is a sectional view of the subject electromagnetic valve taken along line 3—3 of FIG. 4.
Figure 4:
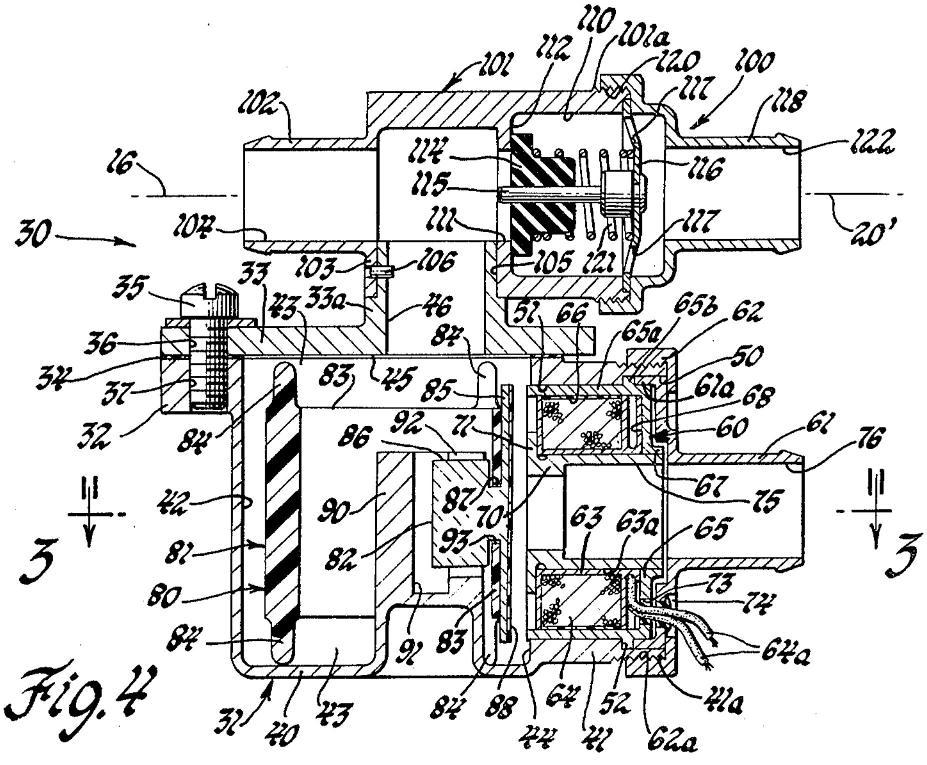
FIG. 4 is a sectional view in elevation of the electromagnetic valve of FIG. 1 taken along line 4—4 of FIG. 2; and, FIG. 5 is a schematic illustration of a simplified electrical control circuit for selective energization of the respective solenoids of the electromagnetic valve of the subject invention.

As best seen in FIGS. 2, 3 and 4, the valve body 32 includes a lower base wall 40 integral with three equally spaced apart, tubular side body extensions 41 and with three curved apex corners 42. As shown in FIG. 3, each apex corner 42 interconnects the ends of the next adjacent side body extensions 41. Also as seen in this Figure, each of the side body extensions 41 extends radially outward relative to a central vertical axis of the valve housing.

Still referring to FIG. 3, the interior of the valve body 32 is formed so as to provide a delta or equilateral triangular shaped valve chamber 43, also referred to as a deltoid valve chamber, which is defined in part by the interior wall surfaces 44 of the side body extensions 41 and by the internal wall surfaces of the apex corners 42 of the valve body 32. As best seen in FIG. 4, the valve chamber 43 is enclosed on one end by the bottom or base wall 40 of the valve body 32 and it is partly enclosed at its opposite end by the bottom surface 45 of cover 33. Cover 33 is provided with a vertical inlet passage 46 (FIG. 4) opening centrally into the valve chamber 43.

Each side body extension 41 is provided with a stepped horizontal through bore, with reference to FIGS. 3 and 4, that opens into the valve chamber 43. Each such bore in a side body extension defining a cylindrical, internal outboard wall 50 and a cylindrical, internal inboard wall 51. Wall 50, which is of greater internal diameter than wall 51, is connected to the wall 51 by a flat shoulder 52.

To provide for the electromagnetic operation of each of the valves to be described, each side body extension 41 operatively supports an electromagnetic coil means, generally designated 60, which is operatively retained in its associated side body extension 41 by means of an outlet tube fitting 61 and a retainer ring 62 in a manner to be described in detail hereinafter.

Each electromagnetic coil means 60 includes a tubular coil bobbin 63 supporting a wound solenoid wire coil 64 thereon (FIGS 3 and 4). A coil bobbin 63 is supported within its associated side body extension 41 by means of a cylindrical coil sleeve 65. For this purpose, as shown in FIGS. 3 and 4, each such coil seve 65 includes an inboard cylindrical portion 65*a* of a diameter whereby it is slidably received by the internal inboard wall 51 of an associated side body extension 41 and a radial flange portion 65*b* of a suitable outside diameter so as to be slidably received by the internal outboard wall 51, with the inboard face of this flange 65*b* then abutting against the shoulder 52.

Each cylindrical coil sleeve 65 is provided with a through stepped bore defining a cylindrical internal inboard wall 66 of a suitable internal diameter for slidably receiving the coil bobbin 63 and an internal outboard wall 67 of a diameter corresponding to the inside diameter of the bore passage through the coil bobbin 63. Walls 66 and 67 are interconnected by a flat radial shoulder 68.

Each coil bobbin 63 is supported within the internal inboard wall of its associated coil sleeve 65 with its outboard end positioned so as to abut against the flat radial shoulder 68 within the coil sleeve. The coil bobbin 63 is axially retained within the respective coil sleeve 65 by means of a cylindrical pole piece 70 which has its axial extending outboard tubular portion slidably extending through the bore 63*a* of the coil bobbin 63 with its free or outboard end suitably secured to the coil sleeve 65, as by a press fit engagement with the wall 67 of the coil sleeve 65. As shown, the coil bobbin 63 is thus sandwiched between the flat shoulder 68 of the coil sleeve 65 and the radial flange 71 of the associated pole piece 70.

In the construction illustrated, each such electromagnetic coil means 60, together with the associated outlet tube fitting 61, is axially retained in its associated side body extension 41 by means of a retainer ring 62 that has the internal threads 62*a* thereof engaged with the external threads 41*a* at the outboard end of the associated side body extension. Retainer ring 62 is thus fixed to its associated side body extension 41 whereby to force the axial extending outer flange 61*a* of the associated fitting 61 to abut against the flanges 65*b* of the associated coil sleeve 65 whereby to force the latter into abutment against the shoulder 52 (FIGS. 3 and 4).

The axial extent of each pole piece 70 and of the associated coil sleeve 65 is such that the inboard or free end surfaces thereof will extend at least to the plane of the associated interior wall 44 of the associated side body extension 41, but preferably so as to extend beyond this surface 44, as shown in FIGS. 3 and 4. With this arrangement the inboard end of an electrical coil means 60 will be operative whereby it, in association with the respective interior wall surface 44, will define one side of the valve chamber 43. In addition, by having the free end of the coil sleeve 65 and the associated free end surface of the flange 71 of the associated pole piece 70 extending beyond the associated interior wall surface 44, as shown in FIGS. 3 and 4, the movable valve element 82, operatively associated therewith can operatively effect seating engagement therewith, in a manner to be described in detail hereinafter.

As seen in FIG. 4, each coil sleeve 65 and the associated outlet tube fitting 61 is provided with apertures 73 and 74 respectively through which the terminal lead ends 64*a* of the associated wire coil 64 extend whereby the wire coil can be connected by electrical control circuit wires, not shown, to a suitable source of electrical power via control switches (FIG. 5) or an electrical control circuit, not shown, whereby each solenoid coil can be energized or de-energized. For example, the desired solenoid coils 64 can be energized as a function of engine operation in a desired manner, known in the art if the subject electromagnetic control valve is used as an air control valve in an exhaust emission control system as shown in FIG. 1.

Each pole piece 70 and its associated outlet tube fitting 61 are provided with co-axial passages 75 and 76, respectively, whereby to define one of the outlet passages 75, 76 from the valve housing 31. Thus, as seen in FIG. 3, three such outlet passages 75, 76 are provided from the valve housing, with each such outlet passage opening at one end from the valve chamber 43 and being connectable at its opposite end to an associated conduit, as desired.

The three electromagnetic coil means 60 have an armature valve member 80 operatively associated therewith, with this valve member 80 being movably positioned in the valve chamber 43 for movement, in a manner to be described, whereby it is operative so as to block flow out through a pair of outlet passage 75, 76, while permitting flow out through the remaining outlet passage.

As best seen in FIG. 3, the valve member 80 includes a hollow three sided or delta shaped valve carrier 81 and three armature valve elements 82 supported thereby, in a manner to be described.

As seen in FIG. 3, the valve carrier 81, made of nonmagnetic material, such as heat stabilized nylon, is formed so as to have a configuration similar to that of the valve chamber 43. However, the valve carrier 81 is formed so as to have a substantially smaller triangular configuration than the triangular configuration of the valve chamber 43 whereby this valve carrier 81 can accommodate the valve elements 82 thereon and still be movable within the valve chamber in a manner to be described so as to permit fluid flow to any one of the outlet passages.

For these reasons, the valve carrier 81 includes three interconnected side walls 83 of uniform length and width, with the width of each wall 83 being substantially less than the maximum distance between the inside surface of the base wall 40 of the body 32 and the lower surface 45 of cover 33. The valve carrier 81 also includes opposed sets of support posts 84 (FIG. 4) that extend outward at each corner from opposite sides of the adjacent side walls 83 whereby opposite edge surfaces of the side walls are uniformly spaced from the surfaces defining the lower and upper ends of the valve chamber 43 as seen in FIG. 4. The combined extent of a pair of these support posts 84 and the adjoining side walls 83 is slightly less than the extent between the inside surface of the base wall 40 and the lower surface 45 of cover 33. With this arrangement the valve carrier 81 is loosely positioned for movement within the valve chamber 43 and passage means are provided between the interior surfaces of the valve chamber 43 and the exposed surfaces of the valve carrier 81 to permit for the free flow of fluid from the inlet passage 46 to any one of the outlet passages 75, 76, with this flow being controlled in a manner to be described.

Each valve element 82 made of a suitable material to serve as the movable armature of an electromagnetic solenoid assembly, is of T-shaped configuration and includes a flat valve disc 85 and a flat stem 86 with an intermediate circular guide 87 therebetween, the latter two elements extending from the center of the valve disc on one side thereof. The free end face of each valve disc 85 preferably has a suitable seal disc 88 fixed thereto. In the embodiment shown, this seal disc 88 is in the form of a coating of epichlorohydrin rubber which is approximately 0.20 to 0.30 millimeters thick for use of the subject valve assembly as an air control valve in an emission control system application for a particular engine.

For guiding the valve elements 82 whereby each such valve element will move co-axial with its associated outlet passage 75, 76, the lower base wall 40 of the valve body 32 is provided with an upstanding boss 90 that projects upward into the center of the valve chamber 43 a predetermined axial distance (FIG. 4). The vertical center of the valve chamber 43, as seen in FIG. 3, will correspond in effect to a point at which the axes of the outlet passage 75, 76 would intersect.

As shown in FIGS. 3 and 4, the boss 90 is provided with an axial blind bore 91 that extends a predetermined distance from the upper free end of the boss and with three radial slots 92 which intersect the blind bore 91. Each such slot 92 is of predetermined width so as to slidably receive the flat stem 86 of an associated valve element 82 and it is centrally aligned with the axis of the respective associated outlet passage 75, 76 as seen in FIG. 3.

Each valve element 82 has the flat stem 86 thereof positioned so as to extend through an associated slot opening 93 in a side wall 83 of valve carrier 81, in the manner to be described whereby it is slidably received in an associated radial slot 92 (FIGS. 3 and 4) in the boss 90 of the valve body 32.

Each side wall 83 of the valve carrier 81 is provided with a slot opening 93 therein that is centrally located on the side wall and which is of a suitable longitudinal extended configuration, as seen in FIG. 3, and of a suitable width corresponding to the outside diameter of the circular guide 87 of an associated valve element 82 whereby to slidably receive the circular guide therein. The axial extent of each circular guide 87 is sufficiently greater than the thickness of the side wall 83 with which it is associated whereby the valve element 82 is free to move longitudinally in either direction with respect to the associated side wall 83 of the valve carrier 81 (FIG. 3).

With this arrangement, each side wall 83 thus operatively supports an associated valve element 82 as is movable therewith upon axial movement of that valve element 82 between a closed position at which that valve element is positioned to block flow through its associated outlet passage 75, 76 and an open position relative to that outlet passage whereby to permit fluid flow therethrough.

In the embodiment shown wherein the subject electromagnetic control valve 30 is illustrated as being used as an air control valve for controlling flow of secondary air in an exhaust emission control system, the cover 33 has a relief valve assembly, generally designated 100, suitably fixed thereto.

In the construction illustrated, relief valve assembly 100 includes a tubular relief valve housing 101 provided with an inlet fitting 102 at one end thereof and a radial side fitting 103 intermediate its ends. Relief valve housing 101 is provided with a lateral inlet passge 104 which extends from the free end of the inlet fitting 102 to intersect a vertical bore 105 that extends through the radial side fitting 103. Bore 105 is of a suitable inside diameter so as to slidably receive the reduced diameter free end of the tubular vertical extension **33*a* of cover 33. In the embodiment shown, relief valve housing 101 is fixed to cover 33 by means of a plurality of retainer pins 106, only one being shown in FIG. 4, each of which extends through an associated one of a plurality of suitably circumferentially spaced apart, radial apertures provided for this purpose in the side fitting 103 and extension 33*a* of the relief valve housing 101 and cover 33**, respectively.

In the arrangement shown, inlet fitting 102 is adapted to be connected by the conduit 16 to the discharge side of the air pump 15 whereby secondary air can be supplied via the inlet passages 104 and 46 to the valve chamber 43.

As shown in FIG. 4, the relief valve housing 101 has a pressure relief passage 110 extending from a lateral opening 111 that opens into the inboard end of the inlet passage 104. A valve seat 112 is formed about opening 111 and is adapted to be engaged by a valve member 114 which slides on a shaft 115 suitably fixed at one end to a support disc 116. Support disc 116 is suitably fixed to the inboard end of the relief valve housing 101 opposite the inlet fitting thereof. In the construction illustrated the support disc 116, which is provided with a plurality of apertures 117 therethrough, is fixed to the relief valve housing 101, as by being sandwiched between the inboard end of this housing and an outlet fitting 118 having the internal threads 120 thereon threadedly engaged with the external threads **101*a* on the relief valve housing 101**.

A pressure relief feature is provided by a calibrated spring 121 which normally biases valve member 114 against the valve seat 112 until the discharge pressure from air pump 15 in the inlet passage 104 rises above a predetermined level. At that level, valve member 114 is moved axially in a direction on the shaft 115 whereby it unseals from the valve seat 112 and a portion of the air flow through inlet passage 104 is diverted through the apertures 117 in support disc 116 and through the outlet relief passage 122 in outlet fitting 118 for discharge to the atmosphere. In the embodiment illustrated, outlet fitting 118 connected by a branch conduit 20' to conduit 20 for the discharge of air into the air cleaner 3 (FIG. 1).

Figure 5:
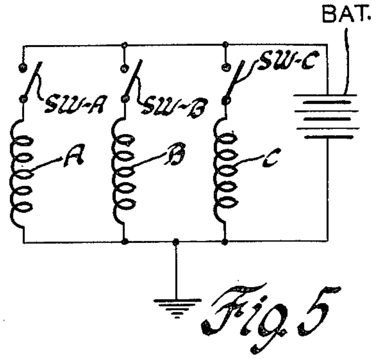

For the purpose of describing the operation of the subject electromagnetic control valve assembly, the solenoid coil means 60 have also been designated in FIGS. 1 and 3 as solenoid coils A, B and C and these coils are also thus designated in the electrical schematic drawing of FIG. 5. Also, for purposes of description of operation of the subject valve assembly, each of the solenoid coils A, B and C are shown in FIG. 5 as being connected by suitable switch means SW-A, SW-B, SW-C, respectively to a common source of electrical power, for example, the electrical battery Bat. of a vehicle. Such a battery Bat. would be the source of power if the subject electromagnetic valve is used as an air control valve in the manner shown in FIG. 1. It will be apparent to those skilled in the art that the switch means SW-A, SW-B and SW-C can be either manually or electrically operated switches.

In operation, when any two of these switches are closed, the corresponding solenoid coils would be energized so as to cause the corresponding associated valve elements 82 to be magnetically attracted to the pole pieces associated therewith, causing the respective valve elements 82 to move in respective directions to positions blocking flow through the corresponding associated outlet passages 75, 76. As these two valve elements 82 move to their respective closed positions relative to their associated outlet passages, the valve carrier 81 will be moved by these valve elements in a corresponding direction. The remaining or third valve element 82 will then be moved by movement of the valve carrier 81 to a position permitting flow through its associated outlet passage.

For operation of the subject electromagnetic control valve 30 as an air control valve in an exhaust emission control system as shown in FIG. 1, the solenoid coil A is shown as controlling air flow via conduit 17 to adjacent the exhaust ports, not shown, of the engine 1, solenoid coil C is shown as controlling air flow through conduit 18 to a location upstream of the oxidizing converter 11, and solenoid coil B is shown as controlling the by-pass of air to the atmosphere, as by controlling flow through the conduit 20 to the air cleaner 3.

In operation, upon cold start up of engine 1, the solenoid coils B and C would be energized and solenoid coil A would be de-energized to allow air to be discharged through the outlet passage 75, 76 associated with conduit 17 for supplying air to the exhaust gases immediately downstream of the exhaust ports, not shown, of the engine. After engine warm up, solenoid coils A and B would be energized and solenoid coil C would be de-energized to allow air to be discharged via the outlet passage 75, 76 associated with conduit 18 for supplying air to the exhaust gases upstream of the oxidizing converter 11. During engine deceleration, the solenoid coils A and C would be energized and solenoid coil B would be de-energized so as to allow all of the secondary air to flow out through the outlet passage 75, 76 associated with the conduit 20 whereby this air would be discharged to the atmosphere.

If desired, the solenoid coil C can be energized continuously and the solenoids A and B are pulse width energized sequentially, the rate of secondary air flow to the exhaust gases downstream of the exhaust ports, not shown, can be controlled in a modulated manner. In the same manner, if solenoid A is energized continuously and the solenoid coils B and C are pulsed width energized sequentially, the rate of secondary air flow to the exhaust gases at a location upstream of the oxidiziing converter 11 can be controlled, in a modulated manner, as desired.

While the invention has been described with reference to a particular embodiment of an electromagnetic control valve as disclosed herein, it is not intended to be confined to the details set forth since it is apparent that various modifications can be made to it by those skilled in the art without departing from the scope of the subject invention. This application is therefore intended to cover such modifications or changes as may come within the purposes of the invention as defined by the following claims.

The embodiments of the invention in which an exclusive property or privilege is claimed are defined as follows:

1. An electromagnetic control valve including a housing having at least three internal side wall means, a top wall and a bottom wall defining a valve chamber, said housing having a port opening through said top wall into said valve chamber and a plurality of side ports with a side port through each of said side walls opening into said valve chamber; a plurality of solenoid coil means operatively connectable to a source of electrical power, each of said side wall means having one of said solenoid coil means associated therewith and located so as to encircle the associated said side port of said side wall means; a non-magnetic valve carrier movably positioned in said valve chamber, said valve carrier having a plurality of sides corresponding in number to the number of said side wall means; and, a plurality of armature valve members corresponding in number to the number of said side ports operatively carried by said side of said valve carrier, each of said armature valve members being operatively positioned for association with an associated one of said solenoid coil means whereby when an associated one of said solenoid coil means is energized its associated said armature valve member is attracted thereto and operatively carries said valve carrier therewith whereby to block passage through the associated said side port, with said valve carrier effecting movement of the remaining said armature valve members whose associated solenoid coil means have not been energized.

2. An electromagnetic control valve including a housing having three spaced apart internal side wall means and a pair of opposed internal end walls defining a deltoid valve chamber having an inlet port and three outlet ports, with each one of said side wall means having one of said outlet ports extending therethrough; and, an electromagnetic means supported by said housing and arranged to control flow from said inlet port selectively out through any one of said outlet ports; said electromagnetic means including a plurality of solenoid coil means with each one of said solenoid coil means being a part of an associated one of said side wall means with said solenoid coil means positioned to encircle the associated said outlet port of said side wall means and operatively connectable to a source of electrical power for selective energization thereof; and a shuttle valve means arranged in said valve chamber for movement to selectively cover and uncover said outlet ports, said shuttle valve means including a non-magnetic, hollow triangular shaped valve carrier and three spaced apart armature valve members operatively carried by said valve carrier, each of said armature valve members being operatively associated with one of said solenoid coil means for movement whereby to cover and uncover the said outlet port associated with said solenoid coil means.

3. An electromagnetic control valve including a housing having three internal side wall means, a top wall and a bottom wall defining a deltoid valve chamber, said housing having a port opening through said top wall into said valve chamber and three side ports with each of said side walls having one of said side ports extending therethrough to open into said valve chamber; three solenoid coil means operatively connectable to a source of electrical power, each of said side wall means having one of said solenoid coil means associated therewith and located so as to encircle the associated said side port of said side wall means; a non-magnetic valve carrier movably positioned in said valve chamber, said valve carrier having three sides and being of delta-shaped configuration; and, three armature valve members with each operatively carried on an associated one of said sides of said valve carrier, each of said armature valve members being operatively positioned for association with an associated one of said solenoid coil means whereby when that associated one of said solenoid coil means is energized its associated said armature valve member is attracted thereto and operatively carries said valve carrier therewith whereby to block passage through the associated said side port, with said valve carrier effecting movement of the remaining said armature valve members whose associated solenoid coil means have not been energized.

4. An electromagnetic control valve including a housing having three internal side wall means, a top wall and a bottom wall defining a deltoid valve chamber, said housing having a port opening through said top wall into said valve chamber and three side ports with each of said side walls having a said side port extending therethrough to open into said valve chamber; a boss extending upward from said bottom wall into said valve chamber; said boss having three spaced apart radial extending guide slots therein, three solenoid coil means operatively connectable to a source of electrical power, each of said side wall means having one of said solenoid coil means associated therewith and located so as to encircle the associated said side port of said side wall means; a non-magnetic shuttle valve carrier movably positioned in said valve chamber, said valve carrier being of delta external configuration with three spaced apart sides; and three armature valve members operatively carried by said valve carrier, each of said armature valve members having a stem portion slidably received at its free end in an associated one of said guide slots in said boss whereby each of said armature valve members is operatively positioned for association with an associated one of said solenoid coil means so that when any two of said solenoid coil means are energized their associated said armature valve members are attracted thereto to operatively carry the valve carrier therewith whereby to block passage through the associated said side ports, with said valve carrier effecting movement of the remaining said armature valve member whose associated solenoid coil means has not been energized to permit flow through said side port associated with the non-energized said solenoid coil means.

5. An electromagnetic control valve including a housing having three internal side wall means forming an equilateral triangle, a top wall and a bottom wall defining a delta-shaped valve chamber, said bottom wall having a boss extending upward centrally into said valve chamber, said boss having three radial extending equally spaced apart guide slots therein, each one of a said guide slot being located at right angles relative to an associated one of said side wall means; said housing having a port opening through said top wall into said valve chamber and three side ports with each one of said side walls having one of said side ports located centrally thereof to open into said valve chamber; three solenoid coil means each operatively connectable to a source of electrical power, each one of said side wall means having one of said solenoid coil means associated therewith and located so as to encircle the associated said side port of said side wall means; an open delta-shaped, non-magnetic, valve carrier having three sides with said valve carrier positioned in said valve chamber for movement therein relative to each of said side walls; and, three armature valve members operatively carried by said valve carrier, each of said armature valve members having a stem slidably received in an associated one of said guide slots so as to be operatively positioned for association with an associated one of said solenoid coil means whereby when any two of said solenoid coil means are energized their associated said armature valve members are attracted thereto and operatively carry the valve carrier therewith whereby to block passage through the associated said side ports, with said valve carrier effecting movement of the remaining said armature valve member to uncover the said side port whose associated solenoid coil means has not been energized.

6. An electromagnetic control valve for use as an air control valve in the exhaust emission control system of an internal combustion engine wherein the system includes conduit means connected to the engine for receiving exhaust gases discharged from the exhaust ports of the engine and for delivering the exhaust gases serially through a reducing converter and an oxidizing converter, and an air supply means for providing secondary air to the conduit means; said electromagnetic control valve including a housing means having a deltoid valve chamber therein defined by first, second and third side walls and a pair of opposed end walls; an inlet in one of said end walls opening into said chamber and adapted to receive air from the air supply means; a first outlet from said chamber in said first side wall connectable to the conduit means upstream of the reducing converter; a second outlet from said chamber in said second side wall connectable to the conduit means intermediate the reducing converter and the oxidizing converter, a third outlet from said chamber in said third side wall for the bypass of air to the atmosphere; a first, second and third electromagnetic coil means associated with each of said first, second and third side walls, respectively, and operatively connectable to a source of electrical power for selective energization thereof; and, a delta-shaped armature valve means movably positioned in said valve chamber; said armature valve means including a delta-shaped valve carrier and three armature valve members opertively carried on said valve carrier and positioned whereby when any two of said electromagnetic coil means are energized said valve means will move into abutment against the side walls associated with the energized said electromagnetic coil means so as to block flow of fluid from said valve chamber out through the said outlets associated with the associated said side walls while permitting flow from said chamber out through said outlet in the said side wall containing the non-energized said electromagnetic coil means.

* * * * *